Mar. 13, 1923. 1,448,257
J. B. CHRABKOW
DIRECTION INDICATOR FOR VEHICLES
Filed Oct. 19, 1922 2 sheets-sheet 1
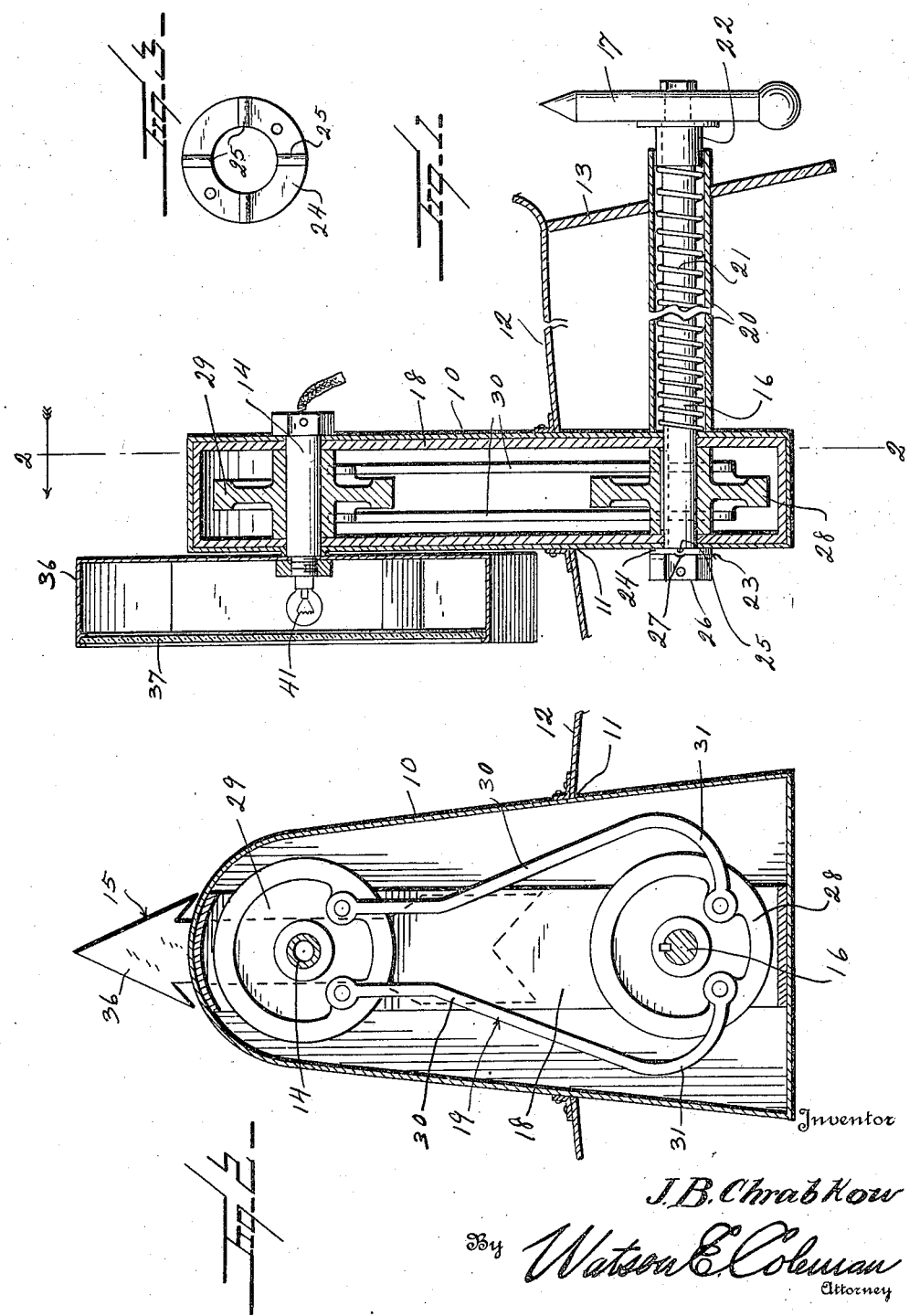

Mar. 13, 1923.  
J. B. CHRABKOW  
DIRECTION INDICATOR FOR VEHICLES  
Filed Oct. 19, 1922  
1,448,257
2 sheets-sheet 2
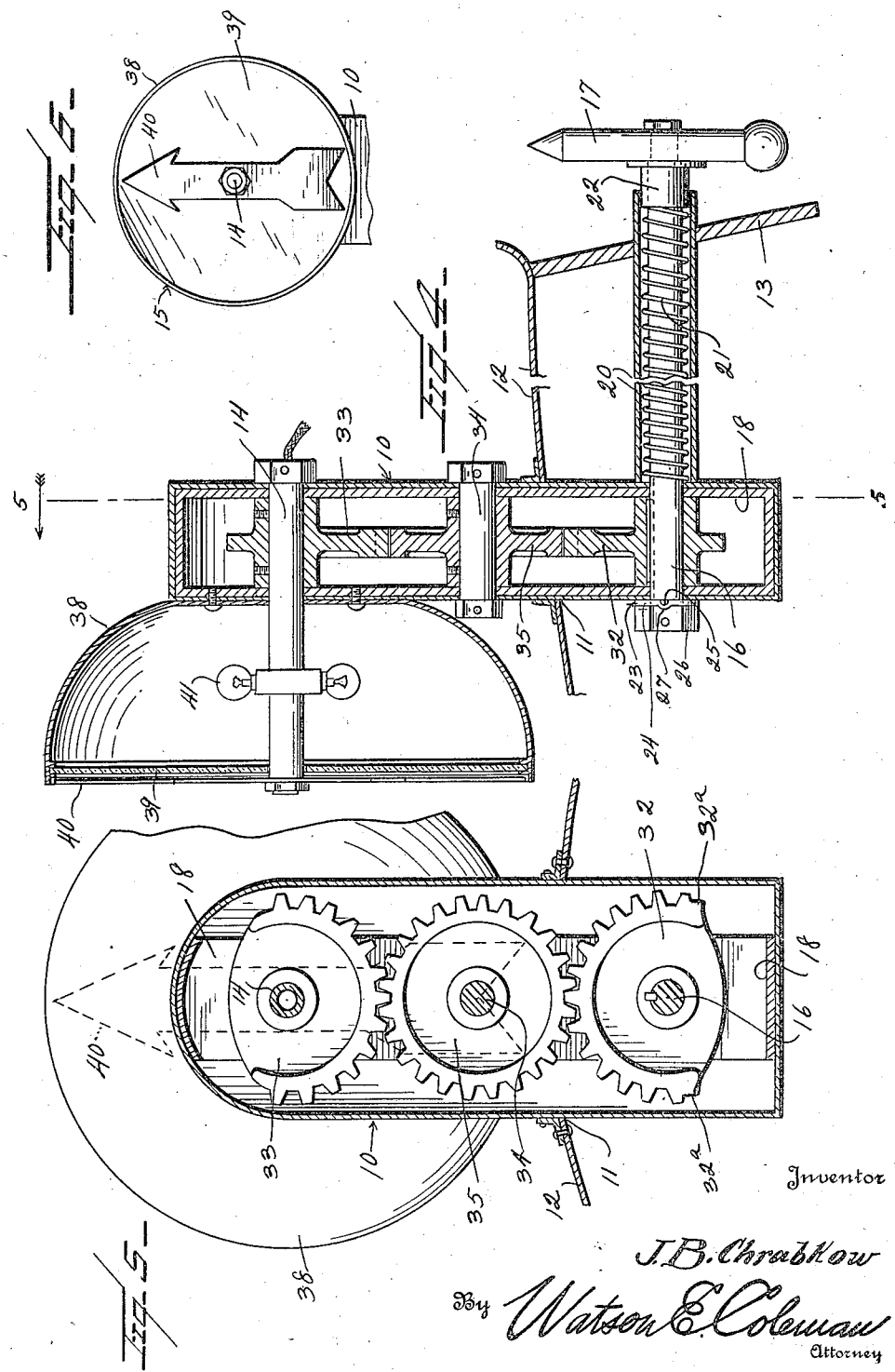

Patented Mar. 13, 1923.

1,448,257

UNITED STATES PATENT OFFICE.

JOHN B. CHRABKOW, OF CINCINNATI, OHIO.

DIRECTION INDICATOR FOR VEHICLES.

Application filed October 19, 1922. Serial No. 595,584.

*To all whom it may concern:*

Be it known that I, JOHN B. CHRABKOW, a citizen of the United States, residing at Cincinnati, in the county of Hamilton and State of Ohio, have invented certain new and useful Improvements in Direction Indicators for Vehicles, of which the following is a specification, reference being had to the accompanying drawings.

This invention relates to improvements in direction indicators for vehicles, and an important object of the invention is to provide a device of this character which may be readily applied to a vehicle and which may be readily operated by the operator of the vehicle to indicate intention of changing his direction.

A further and more particular object of the invention is to provide a novel and improved operating means whereby the indicator may be shifted to a desired indicating position and held in such indicating position when the operating means thereof is released.

A still further object of the invention is to provide a device of this character which is simple in construction and operation, durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a sectional view showing a direction indicator constructed in accordance with my invention;

Figure 2 is a section on the line 2—2 of Figure 1;

Figure 3 is a face view of the locking nut employed;

Figure 4 is a section similar to that shown in Figure 1 of a slightly modified form of construction;

Figure 5 is a section on the line 5—5 of Figure 4; and

Figure 6 is a face view of the dial employed.

Referring now more particularly to the drawings, the numeral 10 indicates a casing adapted to be seated in an opening 11 formed in the cowl 12 of a vehicle in such manner that the upper end of the casing extends above the upper surface of the cowl and is visible to the drivers of approaching vehicles. The lower end of this casing is arranged beneath the cowl and in substantial alignment with the instrument board 13 of the vehicle. Through the upper end of the casing is directed a shaft 14 extending longitudinally of the vehicle and to which the indicator is applied, having secured to its forward end indicating means 15 to be hereinafter more fully described. In the lower end of the casing 10 a shaft 16 is mounted, the rear end of which extends through the instrument board 13 and is provided with an operating handle 17. The shafts 14 and 16 are preferably journaled in a frame 18 arranged within the casing 10 and are connected by suitable control means 19 by means of which rotation of the shaft 16 through the operating handle 17 results in similar rotation of the shaft 14 and accordingly corresponding movement of the indicating means 15 to the operating handle 17.

The shaft 16 has mounted upon the rear end thereof a sleeve 20 the bore of which is of greater diameter than the diameter of the shaft 16 and between this sleeve and the shaft and abutting the casing 10 with one end is arranged a spring 21. Upon the shaft adjacent the operating handle 17 is arranged a spring follower 22 which is secured to the shaft and against which the opposite end of the spring 21 abuts. The shaft 16 is rotatably and slidably mounted in the casing 10 and frame 18 and accordingly the action of the spring 21 tends to force the shaft to the limit of its movement in one direction so that the operating handle 17 is normally spaced from the adjacent end of the sleeve 20. The pressure of the spring 21 is of such character it is easily overcome by the operator by simply engaging his hand therewith to shift the shaft so that the operating handle comes into engagement with the end of the sleeve and the lock mechanism 23 for maintaining the shaft 16 in adjusted positions is disengaged. This lock mechanism comprises a washer like element 24 secured to the casing 10 at the front face thereof and through which the shaft 16 extends. This element has struck up from the upper face thereof ribs or ridges 25. Secured to the end of the shaft 16 is a stop member 26 in the form of a nut threaded upon the end of the shaft and having formed upon its inner face recesses 27 adapted to receive the ribs or ridges 25. It will be seen that normally the spring 21 will maintain the ribs in engagement with these notches but that upon application of pressure upon the handle 17, the shaft 16 is shifted longitudinally permitting the inner face of the nut to clear the outer face of the ridges or ribs and accordingly permitting rotation of the shaft 16. Since motion of the shaft 16 is transmitted to the shaft 14, it will be seen that the indicator mechanism 15 is locked in position when the ribs and recesses are engaged and is freed for rotation when these ribs and recesses are disengaged. The particular structure herein shown is merely illustrative, any suitable interdentation between the plate 24 and nut 26 sufficing.

The operating mechanism 19 employed for connecting the shafts 14 and 16 may be either that shown in the form illustrated in Figure (2) or that illustrated in Figure (5). The construction illustrated in the former figure being the cheaper and more readily produced is preferred and consists in a disk like element 28 splined upon the shaft 16 and a similar element 29 secured to the shaft 14, both of these elements being arranged within the casing 10. Connecting arms 30 are provided each in the form of a substantially straight bar having at its lower end an angular portion 31, the upper end of the bar being pivotally connected to the disk like element and the lower end thereof being pivoted to the corresponding point upon the disk like element 28. The bars 30 are mounted upon opposite sides of the shaft 16 and have the included angles thereof formed by the angular portion 31 directed toward the shaft 16. By the use of arms constructed as above described, I am enabled to arrange the pivots of these arms at corresponding sides of the disks and at the same time provide a smoothly operating mechanism which will not bind and by means of which similar rotation of the shaft 14 may be applied from the shaft 16. Upon rotation of the shaft 16 in a given direction, the disk 28, of course, rotates in the same direction, resulting in one of the arms moving substantially vertical and bringing pressure to bear upon the side of the disk 29 tending to rotate the same in the same direction. The remaining arm is substantially idle, the rotation of the disk 28 simply causing the end of the arm attached thereto to swing beneath the shaft 16 and into the included angle between the body portion of the arm 30 and the angular portion 31 thereof, this angular offset giving the necessary clearance to permit rotation of the shaft 16 through 180°. In returning the indicator to normal position, the operation above described is reversed, the arm which previously exerted pressure now exerting a pull and the other arm which was previously idle again idling to permit this return movement. Upon rotation of the shaft in the opposite direction, the arm previously idle does the work while the arm which is brought into play to cause the motion idles. It will be seen by an inspection of the drawings that the disks 29 are exactly similar in form as are the arms 30, and accordingly this operating mechanism may be produced at a very low cost.

The operating mechanism disclosed in Figure 5 simply consists in a segmental gear 32 splined to the shaft 16 and a similar gear 33 secured to the shaft 14. Intermediate the shafts 14 and 16 a third shaft 34 is journaled in the casing and upon this shaft is mounted a transmitting gear 35 which transmits the motion from the segmental gear 32 to the gear 33, it being understood that the rotation provided by this engagement gives similar rotation of the shafts 14 and 16. The indicating mechanism 15 may be either in the form of an arrow shaped casing 36 having a transparent front face indicated at 37, or in the form of a circular casing 38 having a transparent front face 39 and upon the outer face of which an opaque arrow 40 is disposed. Either the face 39 or arrow 40 may be rotated as desired, the element to be rotated being carried by the shaft 14 and the remaining element being secured to the casing 10 as illustrated. For use at night, the arrow casing 36 or casing 38, as the case may be, will be illuminated by means of a lighting element 41 arranged therein, the conducting cord for the lighting element passing through the shaft 14 which is made hollow for this purpose.

In the construction shown in Figures 1 and 2, rotation of the shaft 16 is, of course, limited to the point where the arms 30 come into contact therewith and accordingly there is no necessity for providing stops for the shaft 16. With the use of the segmental gears 32 and 33 in the form shown in Figures 4 and 5, it becomes necessary to provide some such stop and accordingly upon the gear 32 at the ends of the toothed portion thereof I provide stop shoulders or lugs 32ª against which the teeth of the gear 35 engage to limit the rotation of the shaft 16. It will be obvious that further rotation of the shaft 16 such as would take place were these stops not provided would result in the disengagement of the teeth of the mutilated gear 32 from the teeth of the gear 35 and accordingly a misalignment of the operating handle and indicating mechanism.

It will be obvious that an indicating mechanism such as above described may be very cheaply produced and may be readily operated, the driver being enabled to determine the position of the signal through medium of the pointed end 42 formed upon one end of the handle 17 and pointing in the same direction as the point of the arrow employed to indicate the intended direction of movement. It will furthermore be obvious that the construction as hereinbefore set forth is capable of some change and modification without materially departing from the spirit of my invention and I accordingly do not limit myself to such specific structure except as hereinafter claimed.

I claim:—

1. In a direction indicator, a rotatable indicating element, a shaft upon which the indicating element is mounted, a second shaft axially paralleling the first named shaft, a casing in which the shafts are mounted, a connection between the shafts whereby the rotation of the last named shaft causes corresponding rotation of the shaft bearing the indicating element, said connection permitting independent longitudinal shifting of the last named shaft, and means locking the last named shaft against rotation until longitudinally shifted.

2. In a direction indicator, a rotatable indicating element, a shaft upon which the indicating element is mounted, a second shaft axially paralleling the first named shaft, a casing in which the shafts are mounted, a connection between the shafts whereby the rotation of the last named shaft causes corresponding rotation of the shaft bearing the indicating element, said connection permitting longitudinal shifting of the last named shaft, means locking the last named shaft against rotation until longitudinally shifted, including a shouldered washer secured to the casing, a nut arranged upon the last named shaft for coaction with the washer and having sockets in which the shoulders of the washer are received, a spring surrounding said shaft at the opposite side of the casing from said nut and washer and normally shifting the shaft in a direction to cause engagement of the nut and washer, and an operating handle carried by said shaft.

3. In a direction indicator, a rotatable indicating element, a shaft upon which the indicating element is mounted, a second shaft axially paralleling the first named shaft, a casing in which the shafts are mounted, a connection between the shafts whereby the rotation of the last named shaft causes corresponding rotation of the shaft bearing the indicating element, said connection permitting longitudinal shifting of the last named shaft, means locking the last named shaft against rotation until longitudinally shifted, the connection between the shafts including a disk secured to the first named shaft, a disk mounted upon the second named shaft and held against rotation with relation thereto but permitting longitudinal shifting of the shaft therethrough, and a pair of arms each connected at one end to the first named disk and at its opposite end to the last named disk, the connections between the arms and disks being at opposite sides of said shaft and at corresponding sides of said disks.

4. In a direction indicator, a rotatable indicating element, a shaft upon which the indicating element is mounted, a second shaft axially paralleling the first named shaft, a casing in which the shafts are mounted, a connection between the shafts whereby the rotation of the last named shaft causes corresponding rotation of the shaft bearing the indicating element, said connection permitting longitudinal shifting of the last named shaft, means locking the last named shaft against rotation until longitudinally shifted, the connection between the shafts including a disk secured to the first named shaft, a disk mounted upon the second named shaft and held against rotation with relation thereto but permitting longitudinal shifting of the shaft therethrough, and a pair of arms each connected at one end to the first named disk and at its opposite end to the last named disk, the connections between the arms and disks being at opposite sides of said shaft and at corresponding sides of said disks, each of said arms being provided adjacent the last named shaft with an offset spacing the arm from the shaft.

5. In a device of the type described, a casing, a frame within the casing, a shaft journaled in the upper end of the frame and having its ends projecting through the casing, one end of said shaft being provided with an indicating element, a second shaft journaled in the frame adjacent the lower end thereof and likewise having its ends projecting through the casing and shiftable longitudinally in its journals, means positioned by the frame and carried by said shafts for connecting the shafts for similar rotation, and a lock for the second shaft inoperative upon shifting of the shaft longitudinally in one direction.

6. In a direction indicator, a rotatable indicating element, a shaft upon which the indicating element is mounted, a second shaft axially paralleling the first named shaft, a casing in which the shafts are mounted, and a connection between the shafts whereby the rotation of the last named shaft causes a corresponding rotation of the shaft bearing the indicating element including stop members limiting the rotation of the last named shaft.

In testimony whereof I hereunto affix my signature.

JOHN B. CHRABKOW.